(12) United States Patent
Shin

(10) Patent No.: US 9,220,055 B2
(45) Date of Patent: Dec. 22, 2015

(54) METHODS AND APPARATUS FOR CELL SELECTION/RESELECTION OF A MOBILE TERMINAL FROM A LEGACY NETWORK TO AN ADVANCED NETWORK

(75) Inventor: Jong-Keol Shin, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 924 days.

(21) Appl. No.: 12/637,443

(22) Filed: Dec. 14, 2009

(65) Prior Publication Data

US 2011/0098046 A1 Apr. 28, 2011

Related U.S. Application Data

(60) Provisional application No. 61/254,484, filed on Oct. 23, 2009.

(51) Int. Cl.
*H04W 4/00* (2009.01)
*H04W 48/16* (2009.01)
*H04W 48/18* (2009.01)
*H04W 88/06* (2009.01)

(52) U.S. Cl.
CPC ............ *H04W 48/16* (2013.01); *H04W 48/18* (2013.01); *H04W 88/06* (2013.01)

(58) Field of Classification Search
CPC ..................................................... H04W 36/00
USPC .......... 370/331–338, 343, 401–427; 455/434, 455/552.1, 560
See application file for complete search history.

(56) References Cited

U.S. PATENT DOCUMENTS

| 2010/0041428 A1* | 2/2010 | Chen et al. ................ 455/522 |
| 2010/0184429 A1* | 7/2010 | Tod et al. ................. 455/434 |
| 2010/0190499 A1* | 7/2010 | Wu ......................... 455/436 |
| 2012/0028661 A1* | 2/2012 | Fang et al. ................ 455/466 |

FOREIGN PATENT DOCUMENTS

WO    WO2008020788    *    2/2008

* cited by examiner

*Primary Examiner* — Iqbal Zaidi
(74) *Attorney, Agent, or Firm* — The Farrell Law Firm, P.C.

(57) ABSTRACT

Methods and apparatus are provided for performing a cell selection by a multi-mode terminal from a legacy network (2G, 3G) to a advanced network (4G). The terminal performs the cell selection upon the existence of a Base Station (BS) on the advanced network system. The terminal does not attempt to perform the cell selection when the LTE BS does not exist.

18 Claims, 9 Drawing Sheets

METHODS AND APPARATUS FOR CELL SELECTION/RESELECTION OF A MOBILE TERMINAL FROM A LEGACY NETWORK TO AN ADVANCED NETWORK

PRIORITY

This application claims priority under 35 U.S.C. §119(e) to a provisional application filed in the U.S. Patent and Trademark Office on Oct. 23, 2009 and assigned Ser. No. 61/254,484, the contents of which are incorporated herein by reference.

BACKGROUND OF THE INVENTION

1. Field of the Invention

The present invention relates generally to cell selection, and more particularly, to cell reselection of a multi-mode mobile terminal from a legacy network to an advanced network in a mobile communication system.

2. Description of the Related Art

Upon being powered-on, a Mobile Terminal (MT) performs a cell selection procedure to determine a suitable cell that may be used for camping. Hereinafter, camping refers to the process in which the MT chooses the suitable cell and tunes to the control channel of the cell. Cell reselection is generally performed when the MT finds a more suitable cell for camping than the previously selected cell.

The cell selection and reselection procedures for an MT supporting $3^{rd}$ Generation Partnership Project (3GPP) Release 8 are defined as shown in FIG. 1, which illustrates the 3GPP Legacy and 3GPP Long Term Evolution (LTE) network deployment according to the prior art. Hereinafter, a legacy network refers to a previous generation standard network, including 2G Global System for Mobile communication (GSM)/Enhanced Data rates for Global Evolution (EDGE), 3GPP2 Code Division Multiple Access (CDMA), and 3G Wideband CDMA network, and these terms may be used interchangeably herein. An advanced network as described herein includes a 4G LTE network and a 4G Advanced LTE network. These terms may also be used interchangeably herein.

Referring to FIG. 1, an MT 10 is located in an area of a wireless communication system including a Base Station (BS) 20, an evolved Universal Terrestrial Radio Access Network (eUTRAN) 30, an evolved Node B (eNB) 40 and a plurality of Node Bs (NB1, NB2, NB3). The MT herein refers to a multi-mode terminal that supports both the legacy network and the advanced network. As shown in FIG. 1, the cell area of the eNB 40 overlaps the cell areas of the BS 20, NB1 and NB3. The eNB 40 provides a packet radio base station for the eUTRAN 30.

FIG. 2 illustrates a cell reselection from a legacy network to an advanced (LTE) network according to the prior art. Referring to FIG. 2, in step 201 a terminal is in an idle state in the legacy network (2G/3G) when measurement conditions are met. In step 202, an LTE system measurement is requested by the legacy terminal 50, and after the measurement procedure is performed in step 203, a measurement response is received at the legacy terminal 50 from the LTE terminal 60 in step 204. When it is determined by the legacy terminal 50 to perform a cell reselection in step 205, an Inter Radio Access Technology (I-RAT) cell reselection request in step 206 is made to the LTE terminal 60, which selects an eNB 40 of a cell to which the reselection will be performed in step 207. The cell reselection procedure is then performed in step 208, and in step 209 an I-RAT cell reselection confirmation is sent from the LTE terminal 60 to the legacy terminal 50.

FIG. 3 illustrates the opposite procedure of FIG. 2, i.e., a cell reselection from an LTE network to a legacy network according to the prior art. Referring to FIG. 3, in step 301 a terminal is in an idle state in the advanced network (LTE) 60 when measurement conditions are met. In step 302, legacy system measurement is requested from the LTE terminal 60. After the measurement procedure is performed over the legacy terminal 50, an eNB 40 and a legacy network 70 in step 303, and a measurement response from the legacy terminal 50 is received at the LTE terminal 60 in step 304. When it is determined to perform a cell reselection from the LTE terminal 60 to the legacy terminal 50 in step 305, a cell reselection request in step 306 is made to the legacy terminal 50, and the cell selection procedure is performed over the legacy terminal 50, the eNB 40 and a legacy network 70 of a cell to which the reselection will be performed in step 307. In step 308, an I-RAT cell reselection confirmation is sent from the legacy terminal 50 to the LTE terminal 60.

The migration of a BS in a wireless network from a legacy network to an advanced network is a time-consuming process. The advanced networks, i.e., 4G LTE and 4G Advanced LTE, can support cell selection and cell reselection of an MT by a 2G GSM/EDGE or 3G WCMDA system supporting a previous version 3GPP standard, since the 4G systems have the capability to measure power of the BS in the legacy network. This capability is realized by the acquisition of information of a neighbor cell that supports an advanced network.

In contrast, a legacy network cannot support cell selection and cell reselection of an MT by a system supporting a 4G version 3GPP standard, because the legacy network cannot acquire information of the neighbor cell that supports an advanced network.

In the 3GPP standard, a measurement configuration message including information is received through Layer 3, and the information is used to perform a measurement of another network. In certain instances, a BS supporting a legacy network cannot transmit this information to the MT, preventing the MT from finding an advanced network. A periodic search is thus performed by the MT, to find a suitable LTE network for camping.

In those instances when the BS can transmit the information of the measurement configuration message to the MT, it is possible for the MT to recognize the LTE cell in the neighborhood. However, this recognition is not possible in the legacy networks by virtue of transmission of this information from the BS, which does not support the advanced network, such as 3GPP Releases 7, 8 or later, at the early deployment of the advanced network. Moreover, the MT in the legacy network may attempt to search for cells that cannot be selected since there are no cells for the LTE network, thereby incurring a waste in power consumption.

SUMMARY OF THE INVENTION

The present invention has been made to address at least the above problems and/or disadvantages and to provide at least the advantages described below. Accordingly, an aspect of the present invention provides a method for reducing power consumption by an MT in a mobile communication system, by performing a cell search for a cell reselection only when LTE base stations exist.

According to an aspect of the present invention, a method is provided for performing cell reselection from a legacy network to an advanced network by a terminal, the method including receiving information from a Base Station (BS) of the advanced network; storing a cell IDentification (ID) of each of a legacy network and the advanced network, using the information; and creating the mapping table between the legacy network and the advanced network using the cell IDs.

According to an additional aspect of the present invention, a method is provided for performing cell reselection from a legacy network to an advanced network by a terminal, including pre-storing a cell ID of the legacy network and the advanced network in a mapping table, connecting to the advanced network using the pre-stored cell identifications, and updating the mapping table, upon receipt of new data.

According to a further aspect of the present invention, a system is provided for cell selection, including a terminal for transmitting a report including a first cell ID of a neighbor cell to a BS, and the BS for transmitting a command message for obtaining a second cell ID of the neighbor cell. The terminal receives the message, obtains the second cell ID and stores the second cell ID in a mapping table, for cell selection.

According to another aspect of the present invention, a method is provided for cell reselection from a legacy network to an advanced network, including performing registration on a legacy network, entering an idle state when a received signal from the legacy network is less than a threshold, accessing a cell ID of the legacy network and an advanced network from a mapping table, and performing the cell reselection from the legacy network to the advanced network, when the received signal of the advanced network is greater than the threshold.

Additionally, according to a further aspect of the present invention, an apparatus is provided for cell reselection, including a receiver for receiving a location of a BS, and a controller for determining a distance from the location of the BS to a location of a terminal, storing the distance in a mapping table and performing the cell reselection when the distance is less than a threshold.

BRIEF DESCRIPTION OF THE DRAWINGS

The above and other aspects, features and advantages of the present invention will be more apparent from the following description when taken in conjunction with the accompanying drawings, in which.

DETAILED DESCRIPTION OF EMBODIMENTS OF THE INVENTION

Figure 1:
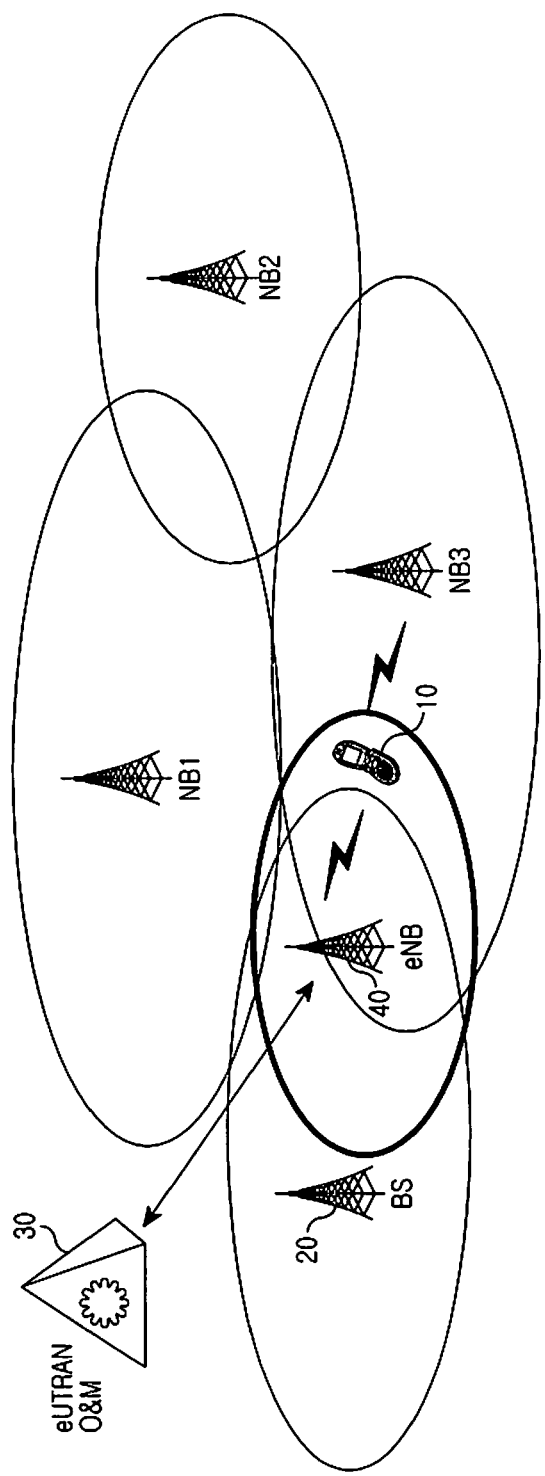
FIG. 1 illustrates a 3GPP Legacy and 3GPP LTE network deployment according to the prior art.
Figure 2:
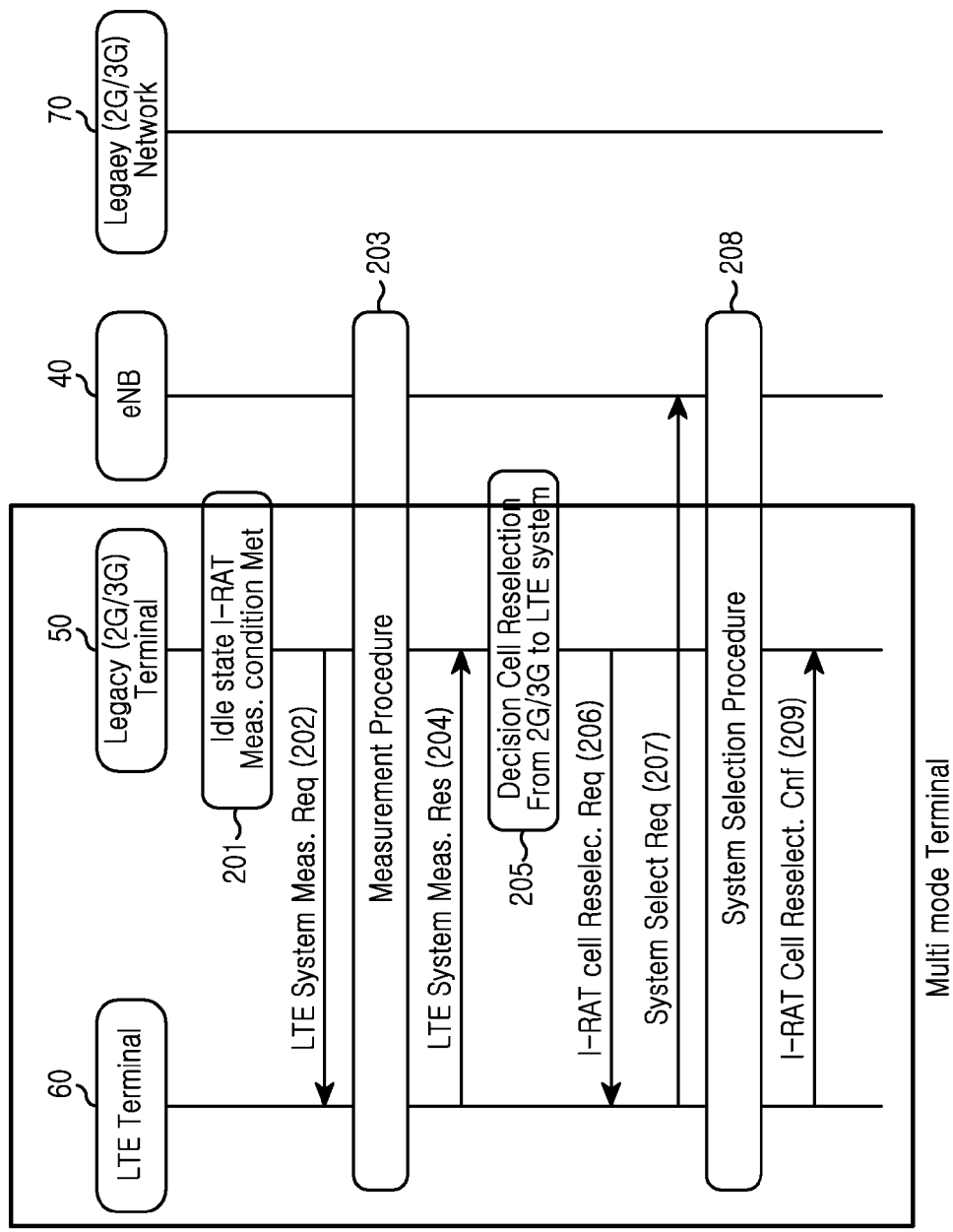
FIG. 2 illustrates a cell reselection procedure from a legacy network to an LTE network according to the prior art.
Figure 3:
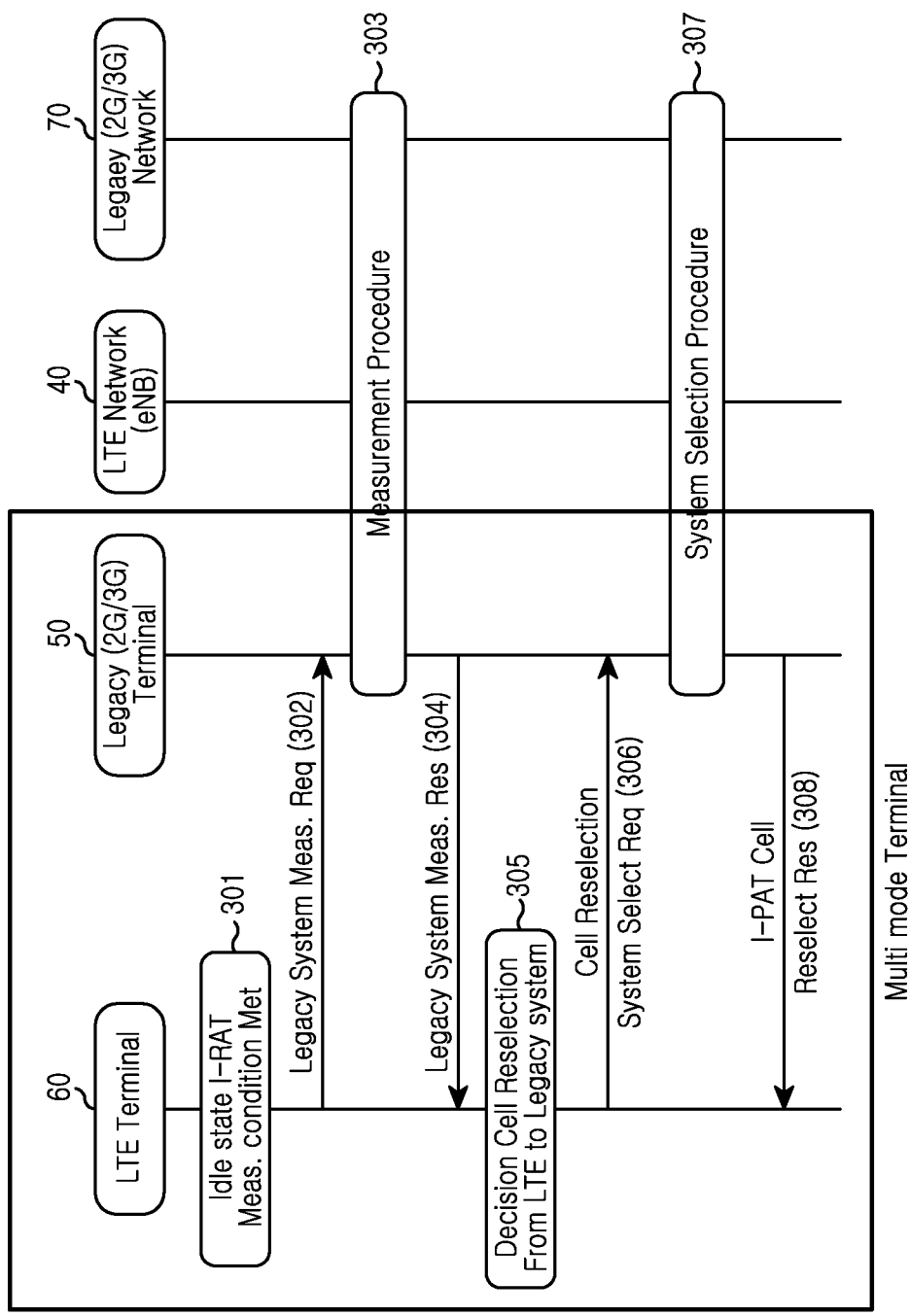
FIG. 3 illustrates a cell reselection procedure from an LTE network to a legacy network according to the prior art.

Embodiments of the present invention are described in detail with reference to the accompanying drawings. The same or similar components may be designated by the same or similar reference numerals although they are illustrated in different drawings. Detailed descriptions of constructions or processes known in the art may be omitted for the sake of clarity and conciseness.

The terms and words used in the following description and claims are not limited to their dictionary meanings, but are merely used to enable a clear and consistent understanding of the invention. Accordingly, it should be apparent to those skilled in the art that the following description of embodiments of the present invention are provided for illustrative purposes only and not for the purpose of limiting the invention, as defined by the appended claims and their equivalents.

It is to be understood that the singular forms "a," "an," and "the" include plural referents unless the context clearly dictates otherwise. Thus, for example, reference to "an identifier" includes reference to one or more of such identifiers.

Figure 4:
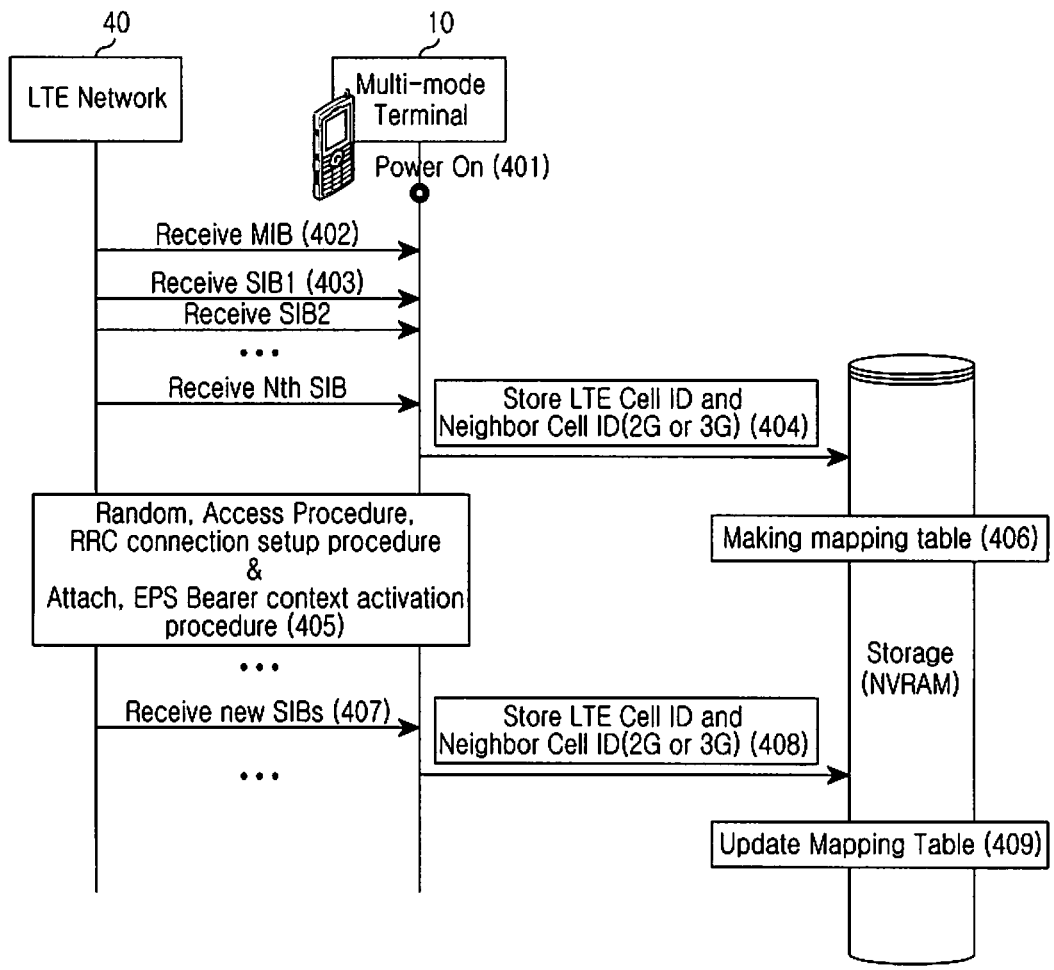
FIG. 4 illustrates a procedure for creating a mapping table of neighbor cell information, according to an embodiment of the present invention.

FIG. 4 illustrates a procedure for creating a mapping table of neighbor cell information, according to an embodiment of the present invention. The neighbor cell refers to a cell of a legacy network. Referring to FIG. 4, after powering-on in step 401, an MT 10 receives information blocks from the LTE network 40. Specifically, the MT 10 receives a Master Information Block (MIB) in step 402 and System Information Blocks (SIB1, SIB2) in step 403, and may receive up to an Nth number (SIBN) of SIBs. One SIB includes 3G Universal Terrestrial Radio Access (UTRA) carrier frequency information in SIB Type 6 information, and the other SIB includes 2G carrier frequency information in SIB Type 7 information.

In step 404, the MT 10 stores cell IDs of the LTE cell and the neighbor cell determined from the information blocks in a Non-Volatile Random Access Memory (NVRAM). In step 405, the MT 10 performs a random access and a Radio Resource Control (RRC) connection setup procedure with the LTE network 40, and attaches to the LTE network 40 in a virtual manner by an Evolved Packet System (EPS) Bearer context activation procedure. In step 406, using the stored information, the MT 10 creates a mapping table of the LTE cell ID and the frequency information of the legacy cell, as shown in Table 1.

TABLE 1

| LTE Physical Cell IDs | Band | EARFCN | Legacy Physical Cell IDs | RAT | Band | ARFCN or UARFCN |
| --- | --- | --- | --- | --- | --- | --- |
| 0x0003 | 2 | 600 | — | UMTS | — | 12 |
|  | 3 | 1200 | — | UMTS | — | 156 |
|  | — | — | — | UMTS | — | 64 |
| 0x0004 | 10 | 4150 | — | GSM | — | 100 |
|  | 34 | 26200 | — | UMTS | — | 3702 |
|  | — | — | — | UMTS | — | 190 |
|  | — | — | — | UMTS | — | 327 |
| 0x0007 | 37 | 27550 | — | GSM | — | 72 |
|  | 40 | 28650 | — | GSM | — | 3 |
|  | — | — | — | GSM | — | 98 |
|  | — | — | — | UMTS | — | 16 |
| ... | ... | ... | ... | — | ... | ... |

Referring to Table 1, column-wise from left to right, the LTE Physical Cell IDs indicates the physical cell IDs in the LTE network, Band indicates the frequency band of the LTE cell, EARFCN indicates an E-Universal Terrestrial Radio Access (UTRA) Absolute Radio Frequency Channel Number (EARFCN) value, Legacy Physical Cell IDs indicates the physical cell IDs in the legacy network, RAT indicates the Radio Access Technology (RAT) of the Legacy physical cell, Band indicates the frequency band of the legacy cell, and ARFCN or UARFCN indicates Absolute Radio Frequency Channel Number (ARFCN) value or Universal ARFCN value.

When one or more new SIBs are received in step 407, the cell IDs of the LTE cell and the neighbor cell are stored and updated in the NVRAM in step 408, and this new information is used to update the mapping table in step 409.

As an alternative to creating the mapping table as illustrated in FIG. 4, mapping table information including the cell IDs of the LTE cell and the legacy cell can be pre-stored in the terminal by a factory setting. These cell IDs may then be updated as previously described in reference to steps 407 to 409 of FIG. 4. In this manner, the MT 10 may use the pre-stored mapping table information to perform a cell reselection to an LTE cell, even when after powering-on the MT 10 first camps on the legacy network instead of the LTE network 40. The mapping table can be updated after power on of the MT 10 by performing steps 407 to 409.

Figure 5:
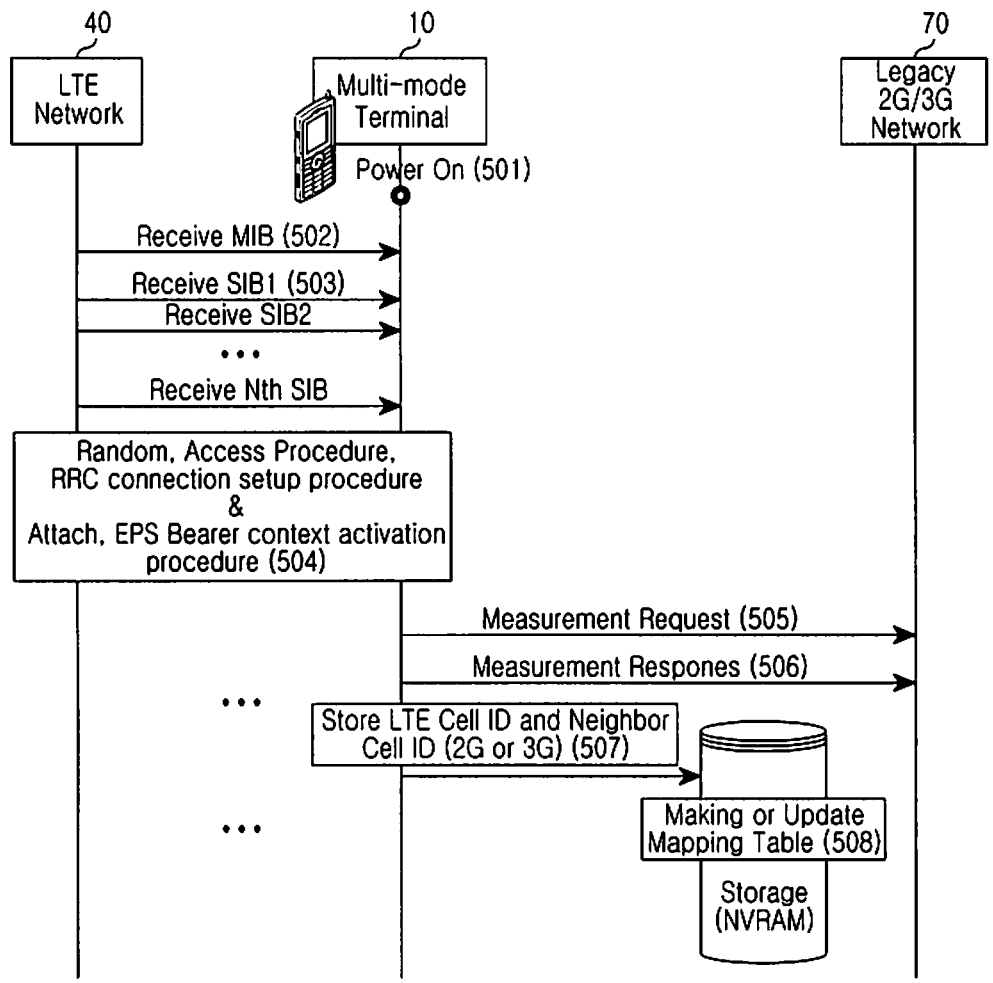
FIG. 5 illustrates a procedure for creating a mapping table of neighbor cell information, according to an embodiment of the present invention.

FIG. 5 illustrates a procedure for creating a mapping table of neighbor cell information, according to an embodiment of the present invention. Referring to FIG. 5, after powering-on in step 501, the MT 10 receives a Master Information Block (MIB) in step 502 and System Information Blocks (SIB1, SIB2) from the LTE network 40 in step 503, and may receive up to an Nth number (SIBN) of SIBs. In step 504, the MT 10 performs a random access and a Radio Resource Control (RRC) connection setup procedure with the LTE network 40, and attaches to the LTE network 60 in a virtual manner by an Evolved Packet System (EPS) Bearer context activation procedure.

In step 505, the MT 10 makes a measurement request to the legacy network 50. When the MT 10 receives a measurement response from the legacy network 70 in step 506, the MT 10 stores the cell IDs of the LTE cell and the neighbor cell in a Non-Volatile Random Access Memory (NVRAM) storage unit in step 507. In step 508, using this stored information, the MT 10 creates a mapping table of the LTE cell ID and the frequency information of the legacy cell, as shown in Table 2.

TABLE 2

| LTE Physical Cell IDs | Band | EARFCN | Legacy Physical Cell IDs | RAT | Band | ARFCN or UARFCN |
|---|---|---|---|---|---|---|
| 0x0003 | 2 | 600 | 0x0001 | UMTS | 2 | 12 |
|  | 3 | 1200 | 0x0002 | UMTS | 5 | 156 |
|  | — | — | 0x0003 | UMTS | 7 | 64 |
|  | 34 | 26200 | 0x000F | UMTS | 12 | 3702 |
|  | — | — | 0x00A6 | UMTS | 6 | 190 |
|  | — | — | 0x01B7 | UMTS | 4 | 327 |
| 0x0007 | 37 | 27550 | 0x001B | GSM | 5 | 72 |
|  | 40 | 28650 | 0x0014 | GSM | 6 | 3 |
|  | — | — | 0x0019 | GSM | 3 | 98 |
|  | — | — | 0x00C4 | UMTS | 1 | 16 |
| ... | ... | ... | ... | ... | ... | ... |

Referring to Table 2, column-wise from left to right, the LTE Physical Cell IDs indicates the physical cell IDs in the LTE network, Band indicates the frequency band of the LTE cell, EARFCN indicates an E-Universal Terrestrial Radio Access (UTRA) Absolute Radio Frequency Channel Number (EARFCN) value, Legacy Physical Cell IDs indicates the physical cell IDs in the legacy network, RAT indicates the Radio Access Technology (RAT) of the Legacy physical cell, Band indicates the frequency band of the legacy cell, and ARFCN or UARFCN indicates Absolute Radio Frequency Channel Number (ARFCN) value or Universal ARFCN value.

When one or more new SIBs are received, the cell IDs of the LTE cell and the neighbor cell of a legacy network are updated in the storage unit. This new information is used to update the mapping table, or if the mapping table is empty, to create the mapping table.

As an alternative to creating the mapping table in FIG. 5 as described above, mapping table information including the cell IDs of the LTE cell and the legacy cell can be pre-stored in the terminal by a factory setting. These cell IDs are updated as previously described in reference to FIG. 5. In this manner, the MT 10 may use the pre-stored mapping table information to perform a cell reselection to an LTE cell, even when after powering-on the MT first camps on the legacy network 70 instead of the LTE network 40. The mapping table can be updated after power on of the MT 10 by performing steps 505 to 508.

In another method for transmitting cell ID information to an MT in the present invention, Evolved Packet System (EPS) Mobility Management (EMM) information is requested by the MT through a Non-Access Stratum (NAS) control message from a Mobility Management Entity (MME), and a response is received through a NAS control message. This information includes neighbor cell ID information, which is used to create a mapping table for the cell selection.

Figure 7:
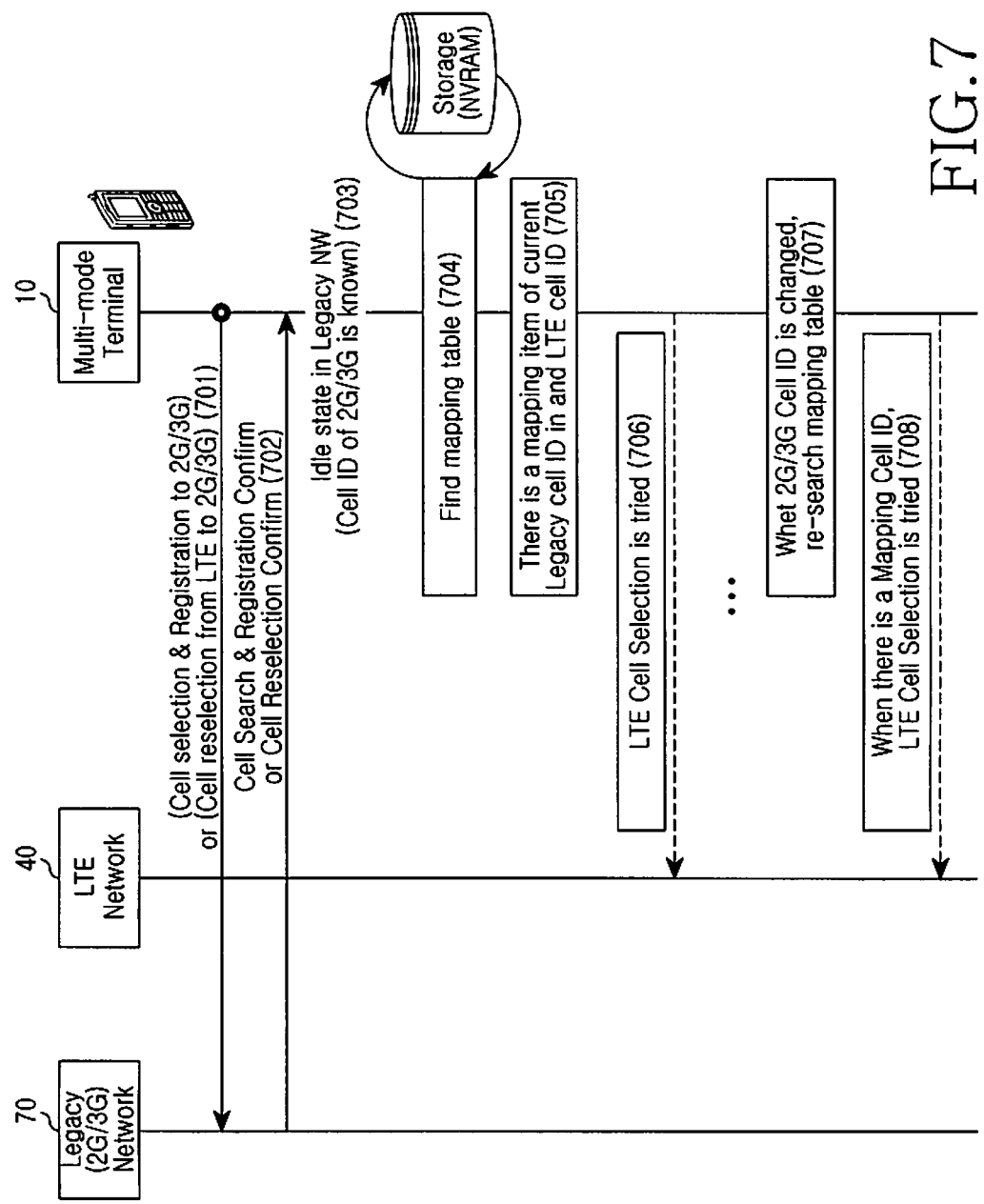
FIG. 7 illustrates a procedure for selecting an LTE network using a mapping table, according to an embodiment of the present invention.
Figure 8:
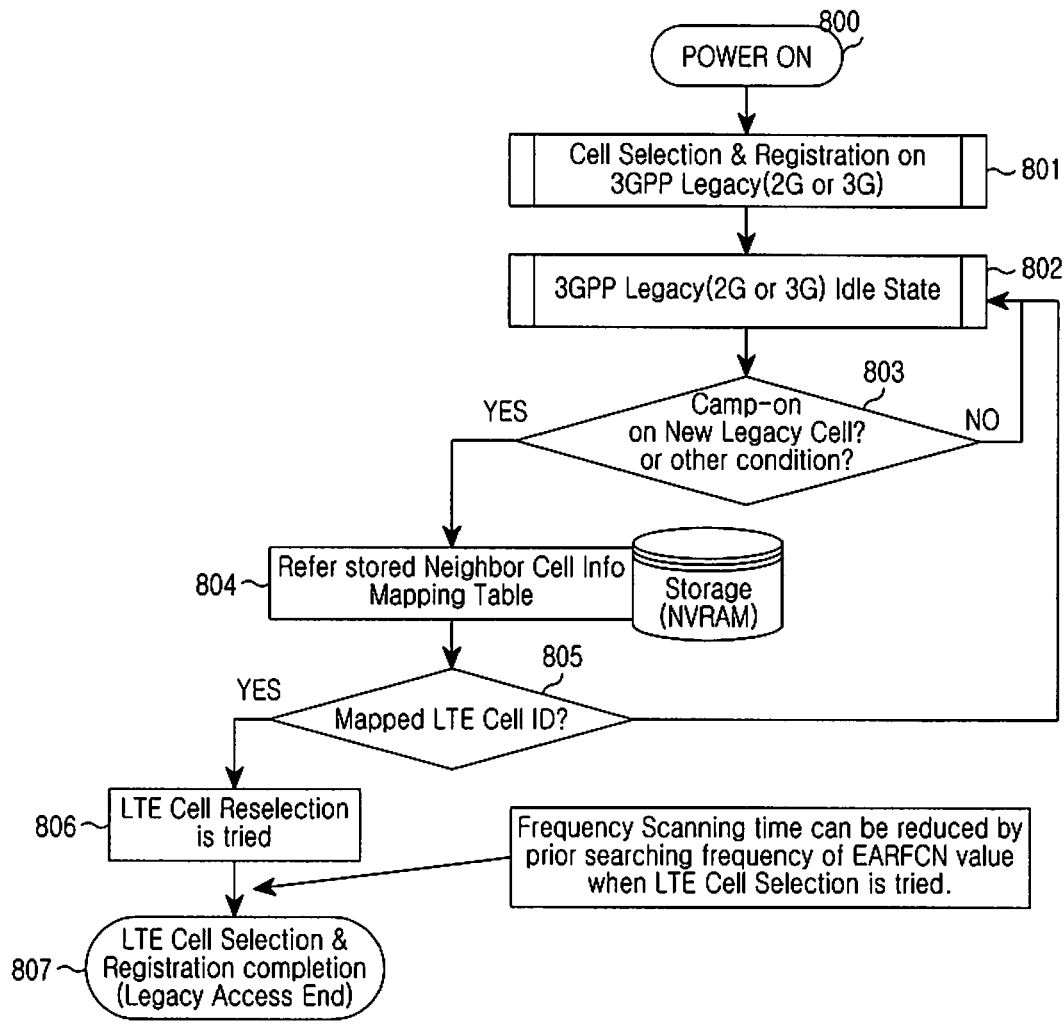
FIG. 8 illustrates a flowchart of a cell reselection procedure according to an embodiment of the present invention.

A terminal may use a physical cell ID of a legacy network to connect to an advanced network in a remote area such as a roaming area, without the involvement of the advanced network. Accordingly, the following methods using Automatic Neighbor Relation (ANR) as applied to the illustration of FIG. 6 and the embodiments of FIGS. 7-8 are disclosed, to enable an MT to use a Global Cell ID from an evolved Node B (eNB) of an advanced network. These methods do not apply to the foregoing embodiments of FIGS. 4 and 5, which require the involvement of the advanced network for receiving frequency information and do not involve a Global Cell ID.

Figure 6:
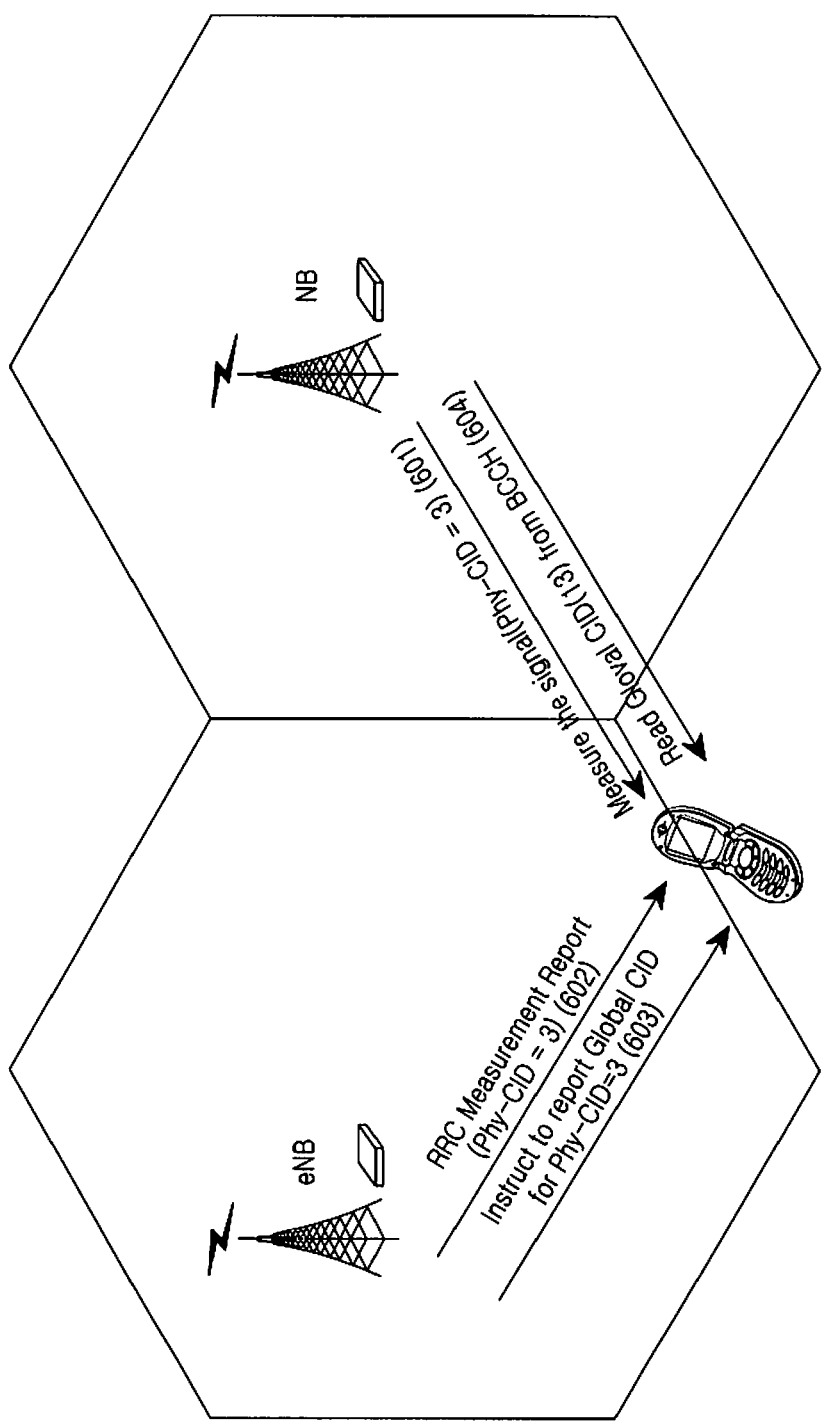
FIG. 6 illustrates an Automatic Neighbor Relation (ANR) procedure in accordance with an embodiment of the present invention.

FIG. 6 illustrates an Automatic Neighbor Relation (ANR) procedure to which the present invention is applied. The ANR procedure enables an MT to receive a Global Cell ID of the legacy network through a control message, and thereby enables the MT to create a mapping table using this received information, as will be explained in more detail below with respect to FIGS. 7-8.

Referring to FIG. 6, an ANR procedure is performed with an MT using an eNB of an advanced network and NB of a legacy network. In step 601, the MT confirms that the physical cell ID of the NB is 3. In step 602, the MT transmits the confirmed physical cell ID to the cell of the eNB, through a Radio Resource Control (RRC) measurement report message.

In step 603, after receiving the message from the MT, the eNB transmits a command message for obtaining a Global Cell ID of the legacy network to the MT. In step 604, upon receipt of the command message, the MT obtains the Global Cell ID of the legacy network through a Broadcast Control CHannel (BCCH) message.

According to an embodiment of the present invention, the MT creates a mapping table using the Global Cell ID obtained through the BCCH message. This mapping table is used for cell selection, as will be described with reference to FIG. 7.

FIG. 7 illustrates a procedure for selecting an LTE network using a mapping table, according to an embodiment of the present invention. In FIG. 7, a cell selection and registration is performed by the MT 10 to a legacy network 70 in step 701.

Alternatively, assuming that a cell reselection is performed by the MT 10 from an advanced network 40 to the legacy network 70 at step 702, when the MT completes registration to the legacy network 70 in step 702, or confirms the cell reselection, the MT enters into an idle state in the legacy network in step 703. The idle state is maintained when a received signal from the legacy network is greater than a threshold.

In step 704, the MT 10 accesses a mapping table from the NVRAM storage unit to retrieve a cell identification (ID) of the legacy network and the advanced network in step 705. When the MT 10 finds a cell ID of the advanced network which is mapped to the cell ID that is currently mapped on the legacy network in step 705, the MT 10 attempts to perform the cell selection to the advanced network 40 in step 706 when the cell ID of the advanced network 40 corresponds to the cell ID of the legacy network 70, and when the signal received from the legacy network 70 is less than a threshold.

The cell selection for the advanced network 40 may be unsuccessful after a first attempt. If so, up to a number N of attempts to perform the cell selection may be made, by returning to step 703 in FIG. 7. Specifically, in step 707, the cell ID may be re-accessed from the mapping table for another cell selection when the cell ID of the legacy network changes such as due to a relocation of the MT 10, or when a cell selection is unsuccessful. In step 708, the cell ID is re-accessed from the mapping table and another cell selection is performed.

FIG. 8 illustrates a flowchart of a cell reselection procedure according to an embodiment of the present invention. Referring to FIG. 8, after powering-on, the MT in step 801 performs a cell selection and registration on a legacy network. In step 802, the MT enters into an idle state. In step 803, the MT determines whether to camp on a cell of another (new) legacy network, which is different from the legacy network of step 801. If it determines to camp on the new legacy network, the process proceeds to step 804 where the MT retrieves cell information of the new legacy network from a mapping table stored in an NVRAM.

In step 805, the MT determines whether the cell ID or frequency information for the advanced network is in the mapping table. If so, the MT attempts a cell reselection to the advanced network in step 806. If successful, the cell reselection is completed in step 807. If the MT determines not to camp on a new legacy network cell in step 803, or that the cell ID for the advanced network is not in the mapping table in step 805, the process returns to step 802.

During the attempt to reselect the advanced network cell in step 806, the frequency scanning time may be reduced by performing a frequency scan in the mapping table for a prior searching frequency information of an E-Universal Terrestrial Radio Access (UTRA) Absolute Radio Frequency Channel Number (EARFCN) value. If it is determined that the frequency of the EARFCN value does not belong to the corresponding cell, another frequency scan may be performed for another frequency, or the cell reselection process may end in step 807.

An instance may occur when cell reselection is performed by an MT, which is outside of a cell boundary area of an advanced network. To facilitate this reselection, the present invention includes the use of Global Positioning System (GPS), Assisted GPS (A-GPS) and LoCation Services (LCS) location information of the advanced network eNB. Such GPS and LCS information provides an accurate determination of the location information, which is used to create a mapping table for cell reselection, as shown in Table 3. Specifically, Table 3 shows the mapping table of LTE cell IDs and Legacy cell IDs including eNB location information (eNB Position Info).

TABLE 3

| | LTE Physical Cell IDs | eNB Position Info | Band | EARFCN | Legacy Physical Cell IDs | RAT | Band | ARFCN or UARFCN |
|---|---|---|---|---|---|---|---|---|
| 1 | 0x0003 | 128° 23'17" | 1 | 0 | 0x0000 | GSM | 3 | 29 |
| | | | 2 | 600 | 0x0001 | UMTS | 2 | 12 |
| | | | 3 | 1200 | 0x0002 | UMTS | 5 | 156 |
| | | | — | — | 0x0003 | UMTS | 7 | 64 |
| 2 | 0x0004 | 130° 56'42" | 7 | 2750 | 0x0001 | GSM | 3 | 421 |
| | | | 10 | 4150 | 0x0003 | GSM | 1 | 100 |
| | | | 34 | 26200 | 0x000F | UMTS | 12 | 3702 |
| | | | — | — | 0x00A6 | UMTS | 6 | 190 |
| | | | — | — | 0x01B7 | UMTS | 4 | 327 |
| 3 | 0x0007 | ... | 35 | 26350 | 0x00F3 | UMTS | 1 | 291 |
| | | | 37 | 27550 | 0x001B | GSM | 5 | 72 |
| | | | 40 | 28650 | 0x0014 | GSM | 6 | 3 |
| | | | — | — | 0x0019 | GSM | 3 | 98 |
| | | | — | — | 0x00C4 | UMTS | 1 | 16 |
| 4 | 0x000A | | ... | ... | ... | ... | ... | ... |
| 5 | 0x003F | | ... | ... | ... | ... | ... | ... |
| ...... | | | ... | ... | ... | ... | ... | ... |
| ...... | | | ... | ... | ... | ... | ... | ... |

Referring to Table 3, column-wise from left to right, the LTE Physical Cell IDs indicates the physical cell IDs in the LTE network, eNB Position Info indicates the position information of the evolved Node B, Band indicates the frequency band of the LTE cell, EARFCN indicates an E-Universal Terrestrial Radio Access (UTRA) Absolute Radio Frequency Channel Number (EARFCN) value, Legacy Physical Cell IDs indicates the physical cell IDs in the legacy network, RAT indicates the Radio Access Technology (RAT) of the Legacy physical cell, Band indicates the frequency band of the legacy cell, and ARFCN or UARFCN indicates Absolute Radio Frequency Channel Number (ARFCN) value or Universal ARFCN value.

The eNB Position Information in Table 3 may be received in the terminal by pre-storing from a factory setting, through a NAS control message, or by a Universal Subscriber Identity Module (USIM) Application Toolkit (USAT) command. This position information is also used to determine the distance between the eNB and the terminal. In this regard, cell reselection is performed when the terminal is within a cell diameter of the advanced network. This determination is made as shown in FIG. 9, which illustrates an MT determining whether to perform cell reselection within the cell area of an advanced network according to an embodiment of the present invention.

Figure 9:
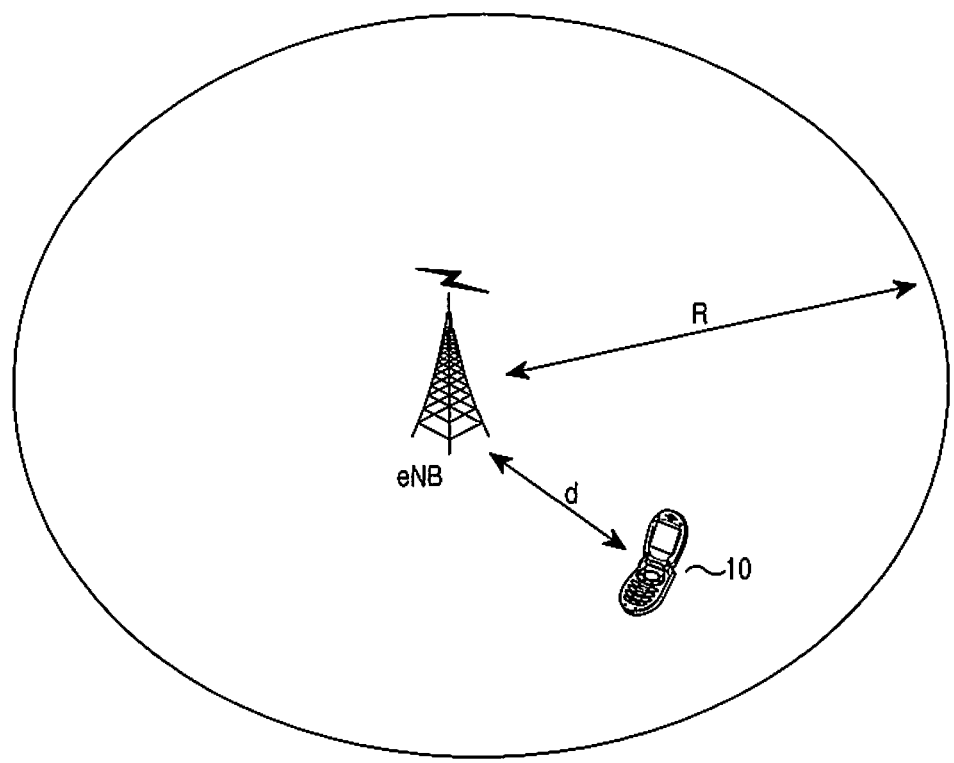
FIG. 9 illustrates an MT determining whether to perform cell reselection within the cell area of an advanced network according to an embodiment of the present invention.

Referring to FIG. 9, the MT 10 calculates a distance from the eNB of the advanced network using the eNB Position Information in Table 3 and location information of the terminal. A distance d is calculated by subtracting the terminal location from the eNB location. A cell diameter R of the eNB is then compared to the distance d. If the distance d is less than the diameter R, the MT is within the cell diameter of the advanced network and the cell reselection is performed. However, the cell reselection is not performed if the distance d is greater than the diameter R.

If the MT 10 does not support GPS or LCS, the location of the MT may be alternatively determined using a triangulation method such as Angle of Arrival (AOA), Time of Arrival (TOA), Time Difference of Arrival (TDOA) or Enhanced Observed Time Difference (E-OTD). Such methods are well known in the art, and thus a detailed description thereof will be omitted for the sake of conciseness.

In accordance with embodiments of the present invention, a multi-mode terminal may perform a cell selection from a legacy network supporting a previous version 3GPP system, to an advanced network supporting a new version 3GPP system. As embodiments of the present invention disclose using a mapping table by the terminal, a frequency searching time is significantly reduced and transmit power waste is minimized. Additionally, since cell reselection is performed in the present invention when an LTE cell is within a neighborhood as determined by searching the mapping table, power consumption of the terminal is substantially reduced.

Although a legacy network in the present invention has been described as including a 2G and a 3G network, and an advanced network has been described as including a 4G network, the present invention is not limited to these inclusions. For example, a legacy network can be one of 3GPP2 networks. In the future, a legacy network in the present invention could also apply to any previous generation network, which could be a 4G network. Likewise, an advanced network in the present invention could also apply in the future to any new network, such as a 5G network or beyond.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method for creating a mapping table in an advanced network of a terminal, comprising:
  receiving a Master Information Block (MIB) and a plurality of System Information Blocks (SIBs) from a Base Station (BS) of the advanced network;
  storing a cell IDentification (ID) of each of a legacy network and the advanced network using the MIB and plurality of SIBs;
  attaching to the advanced network by performing a random access and a Radio Resource Control connection setup procedure with the advanced network;
  transmitting a measurement request to the legacy network, and receiving a measurement response from the legacy network; and
  creating the mapping table between the legacy network and the advanced network using the stored cell IDs based on the measurement response,
  wherein the mapping table is used to select a cell when there is a cell of the advanced network which is mapped to a cell of the legacy network,
  wherein the legacy network is at least one of a Global System for Mobile Communication (GSM), Code Division Multiple Access (CDMA) and a Wideband CDMA network,
  wherein the advanced network is at least one of a Long Term Evolution (LTE) network and an Advanced LTE network,
  wherein the terminal is a multi-mode terminal supporting the legacy network and the advanced network, and
  wherein the terminal connects to the advanced network using frequency information included in first and second SIBs.

2. The method of claim 1, wherein the BS is an evolved Node B.

3. The method of claim 1, wherein the terminal receives the first SIB including frequency information of a first legacy network, and the second SIB including frequency information of a second legacy network that is different from the first legacy network.

4. The method of claim 1, further comprising:
  receiving a new MIB and a new plurality of SIBs; and
  updating the mapping table using the new MIB and the new plurality of SIB.

5. A method for performing cell reselection from a legacy network to an advanced network of a terminal, comprising:
  storing, by the terminal, a cell IDentification (ID) of each of the legacy network and the advanced network in a mapping table;
  attaching to the advanced network using the stored cell ID by performing a random access and a Radio Resource Control connection setup procedure with the advanced network;
  receiving a Master Information Block (MIB) and a plurality of System Information Blocks (SIBs) of the advanced network, and a measurement response according to a measurement request to the legacy network; and
  updating the mapping table using the MIB and the plurality of SIBs, and the cell IDs based on the measurement response,
  wherein the mapping table is used to reselect a cell when there is a cell of the advanced network which is mapped to a cell of the legacy network,
  wherein the legacy network is at least one of a Global System for Mobile Communication (GSM), Code Division Multiple Access (CDMA) and a Wideband CDMA network,
  wherein the advanced network is at least one of a Long Term Evolution (LTE) network and an Advanced LTE network,
  wherein the terminal is a multi-mode terminal supporting the legacy network and the advanced network, and
  wherein the terminal connects to the advanced network using frequency information included in first and second SIBs.

6. The method of claim 5, wherein the information is received from an evolved Node B of the advanced network.

7. The method of claim 5, wherein the MIB and the plurality of SIBs include a new cell ID that is received when the terminal performs a measurement of the legacy network.

8. A system for cell selection, comprising:
  a terminal for transmitting a report including a first cell IDentification (ID) of a neighbor cell; and a Base Station (BS) of an advanced network for receiving the first cell ID and transmitting a command message for obtaining a second cell ID of the neighbor cell, wherein the terminal receives the command message, obtains the second cell ID by obtaining a Master Information Block (MIB) and a plurality of System Information Blocks (SIBs) from the Base Station, stores the second cell ID in a mapping table, attaches to the advanced network for cell selection by performing a random access and a Radio Resource Control connection setup procedure with the advanced network, transmits a measurement request to a legacy network according to the first cell ID, receives a measurement response from the legacy network, and creates the mapping table between the legacy network and the advanced network using the stored cell ID and the first cell ID based on the measurement response, and wherein the mapping table is used to select a cell when there is a cell of the advanced network which is mapped to a cell of the legacy network, wherein the legacy network is at least one of a Global System for Mobile Communication (GSM), Code Division Multiple Access (CDMA) and a Wideband CDMA network, wherein the advanced network is at least one of a Long Term Evolution (LTE) network and an Advanced LTE network, wherein the terminal is a multi-mode terminal supporting the legacy network and the advanced network, and wherein the terminal connects to the advanced network using frequency information included in first and second SIBs.

9. The system of claim 8, wherein the first cell ID comprises a physical cell ID of the legacy network, and the second cell ID comprises a Global cell ID of the legacy network.

10. The system of claim 8, wherein the BS comprises an evolved Node B (eNB) of an advanced network.

11. (A method for a terminal to perform cell reselection from a legacy network to an advanced network, comprising:
performing registration with the legacy network;
maintaining an idle state, when a received signal from the legacy network is greater than a threshold;
accessing a cell IDentification (ID) of the legacy network and the advanced network from a mapping table; and
performing the cell reselection from the legacy network to the advanced network, when the received signal of the legacy network is less than a threshold,
wherein performing the cell reselection includes attaching to the advanced network by performing a random access and a Radio Resource Control connection setup procedure with the advanced network,
wherein the terminal transmits a measurement report to the legacy network, receives a measurement response from the legacy network, and creates the mapping table between the legacy network and the advanced network using the cell IDs based on the measurement response, and
wherein the mapping table is used to reselect a cell when there is a cell of the advanced network which is mapped to a cell of the legacy network,
wherein the legacy network is at least one of a Global System for Mobile Communication (GSM), Code Division Multiple Access (CDMA) and a Wideband CDMA network, wherein the advanced network is at least one of a Long Term Evolution (LTE) network and an Advanced LTE network, wherein the terminal is a multi-mode terminal supporting the legacy network and the advanced network, and wherein the terminal connects to the advanced network using frequency information included in first and second SIBs.

12. The method of claim 11, wherein the cell ID includes a Global cell ID that is received from an evolved Node B (eNB) through a Broadcast Control CHannel (BCCH) message, and is stored in the mapping table.

13. The method of claim 12, wherein the cell ID is re-accessed from the mapping table and another cell selection is performed, when the cell ID changes or cell reselection is unsuccessful.

14. A terminal for cell reselection, comprising:
a receiver for receiving a location of a Base Station (BS) by receiving a Master Information Block (MIB) and a plurality of System Information Blocks (SIBs) from the BS; and
a controller for determining a distance from the location of the BS to a location of the terminal and performing the cell reselection to the advanced network using a mapping table between a legacy network and an advanced network when the distance is less than a predefined threshold,
wherein performing the cell reselection includes attaching to the advanced network by performing a random access and a Radio Resource Control connection setup procedure with an advanced network,
wherein the controller transmits a measurement request to a legacy network, receives a measurement response from the legacy network, and creates the mapping table using cell Identifications (IDs) based on the measurement response, and
wherein the mapping table is used to reselect a cell when there is a cell of the advanced network which is mapped to a cell of the legacy network,
wherein the legacy network is at least one of a Global System for Mobile Communication (GSM), Code Division Multiple Access (CDMA) and a Wideband CDMA network,
wherein the advanced network is at least one of a Long Term Evolution (LTE) network and an Advanced LTE network,
wherein the terminal is a multi-mode terminal supporting the legacy network and the advanced network, and
wherein the terminal connects to the advanced network using frequency information included in first and second SIBs.

15. The apparatus of claim 14, wherein the BS comprises an evolved Node B (eNB) of the advanced network.

16. The apparatus of claim 14, wherein the location information of the BS and the terminal comprises a Global Positioning System (GPS) location.

17. The apparatus of claim 14, wherein the location of the BS is pre-stored in the terminal or is received by a message.

18. The apparatus of claim 14, wherein the location of the BS or terminal is determined by a triangulation method.

* * * * *